(12) United States Patent
Lin et al.

(10) Patent No.: US 12,482,140 B2
(45) Date of Patent: Nov. 25, 2025

(54) METHODS AND SYSTEMS FOR ENCODING DATA USING ARTIFICIAL FINGERPRINTS

(71) Applicant: Xerox Corporation, Norwalk, CT (US)

(72) Inventors: Guo-Yau Lin, The Woodlands, TX (US); Eliud Robles Flores, Rochester, NY (US); David R. Stookey, Walworth, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 412 days.

(21) Appl. No.: 18/154,578

(22) Filed: Jan. 13, 2023

(65) Prior Publication Data
US 2024/0242387 A1    Jul. 18, 2024

(51) Int. Cl.
*G06T 9/00* (2006.01)
*G06F 1/03* (2006.01)

(52) U.S. Cl.
CPC . *G06T 9/00* (2013.01); *G06F 1/03* (2013.01)

(58) Field of Classification Search
CPC .................................. G06T 9/00; G06F 1/03
See application file for complete search history.

(56) References Cited

U.S. PATENT DOCUMENTS

| | | | |
|---|---|---|---|
| 7,533,062 B2 | 5/2009 | Sanchez et al. | |
| 7,744,002 B2 | 6/2010 | Jones et al. | |
| 7,847,981 B2 | 12/2010 | Igarashi | |
| 7,963,449 B2 | 6/2011 | Jones et al. | |
| 8,033,477 B2 | 10/2011 | Jones et al. | |
| 8,265,381 B2 | 9/2012 | Ito | |
| 8,316,425 B2 | 11/2012 | Cattrone et al. | |
| 8,634,066 B1 | 1/2014 | Fraser | |
| 8,736,908 B2 | 5/2014 | Yeap et al. | |
| 9,569,650 B2 | 2/2017 | Hanina et al. | |
| 9,594,994 B2 | 3/2017 | Biró et al. | |
| 10,089,508 B2 | 10/2018 | Arce et al. | |
| 12,041,138 B1 * | 7/2024 | Mahajan | G06F 16/43 |
| 2008/0205766 A1 | 8/2008 | Ito et al. | |

(Continued)

OTHER PUBLICATIONS

K. P. Wijewardena, S. A. Grosz, K. Cao and A. K. Jain, "Fingerprint Template Invertibility: Minutiae vs. Deep Templates," in IEEE Transactions on Information Forensics and Security, vol. 18, pp. 744-757, 2023, doi: 10.1109/TIFS.2022.3229587. (Year: 2022).*

(Continued)

*Primary Examiner* — Amandeep Saini
*Assistant Examiner* — Andrew S Budisalich
(74) *Attorney, Agent, or Firm* — Fox Rothschild LLP (57) ABSTRACT

Systems and methods for encoding data in a machine-readable image (e.g., an artificial fingerprint) are disclosed. The methods include segmenting a plurality of bits included in a bit stream to be encoded into a plurality of blocks such that each block includes two or more of the plurality of bits. The plurality of blocks are used to generate a minutiae template comprising a plurality of minutiae points each of which is representative of a local ridge discontinuity in a fingerprint, and is associated with a location and an orientation. An artificial fingerprint is generated from the minutiae template, and stored in association with the bit stream. The artificial fingerprint encodes the bit stream and comprises a plurality of ridges and a plurality of valleys.

15 Claims, 9 Drawing Sheets

(56) References Cited

U.S. PATENT DOCUMENTS

| | | | |
|---|---|---|---|
| 2011/0045255 A1 | 2/2011 | Jones et al. | |
| 2013/0161387 A1 | 6/2013 | King | |
| 2013/0173484 A1 | 7/2013 | Wesby | |
| 2015/0351068 A1 | 12/2015 | Deleeuw et al. | |
| 2016/0321830 A1* | 11/2016 | Cvetkovic | G06V 10/462 |
| 2016/0358010 A1 | 12/2016 | Yang et al. | |
| 2020/0193117 A1* | 6/2020 | Raff | G06N 3/048 |
| 2022/0052768 A1* | 2/2022 | Farrar | H04B 10/516 |
| 2023/0119262 A1 | 4/2023 | Barnett | |

OTHER PUBLICATIONS

Ambadiyil et al., "Biometric Based Unique ID Generation and One to One Verification for Security Documents," Procedia Computer Science, 46, pp. 507-516 (2015).

Feng and Jain, "Fingerprint Reconstruction: From Minutiae to Phase," IEEE Transactions on Pattern Analysis and Machine Intelligence, 33, pp. 209-223 (2011).

Li and Zhang, "Towards Construction Based Data Hiding: From Secrets to Fingerprint Images," IEEE Transactions on Image Processing, 28(3), pp. 1-15 (Mar. 2019).

A Ross, J. Shah and A K. Jain, "From Template to Image: Reconstructing Fingerprints from Minutiae Points," in IEEE Transactions on Pattern Analysis and Machine Intelligence, vol. 29, No. 4, pp. 544-560, Apr. 2007.

* cited by examiner

METHODS AND SYSTEMS FOR ENCODING DATA USING ARTIFICIAL FINGERPRINTS

BACKGROUND

One-dimensional barcodes and two-dimensional codes have been developed as machine readable image representations of information. Many two-dimensional codes represent data by means of a distribution of dots in a matrix grid and therefore sometimes are referred to as matrix code. A Quick Response (QR) code is a type of matrix code (or two-dimensional barcode), which is a machine-readable optical label that contains information in the form of an array of black cells (square dark dots) and white cells (square light dots) arranged in a square pattern on a white background (or vice versa). Another common matrix code is the EZCode. A typical EZCode consists of an 11×11 array of cells (large dark or light pixels/dots) arranged in a grid.

Two-dimensional codes have become common in consumer marketing, advertising and packaging because a camera (e.g., a mobile device camera) can be used to scan a matrix code. It can provide quick and rather effortless access to the brand's online materials or other designated call to action. Matrix codes have additionally found a wide range of applications, including entertainment and transport ticketing. Other applications include product tracking, item identification, time tracking, document management, and general marketing.

However, existing two-dimensional codes have several limitations. For example, it is often not possible (or extremely difficult) to extract information from a partial and/or damaged two-dimensional code such as a QR code. In addition, existing two-dimensional codes are vulnerable to tampering, and may be used for cyberattacks by, for example, installation of malicious links over legitimate codes.

This patent document describes methods and systems for addressing these and other technical challenges.

SUMMARY

In certain aspects, systems and methods for encoding data in a machine-readable image (e.g., an artificial fingerprint) are disclosed. The systems may include a processor and a non-transitory computer readable medium including programming instructions that can be executed by the processor to perform the methods. The methods may include segmenting a plurality of bits included in a bit stream to be encoded into a plurality of blocks such that each block includes two or more of the plurality of bits. The plurality of blocks may be used to generate a minutiae template comprising a plurality of minutiae points each of which is representative of a local ridge discontinuity in a fingerprint, and is associated with a location and an orientation. An artificial fingerprint may be generated from the minutiae template and stored in association with the bit stream. The artificial fingerprint may encode the bit stream and may include a plurality of ridges and a plurality of valleys. Optionally, the artificial fingerprint may be printed on a substrate.

In various implementations, the methods may further include receiving a data message, and generating the bit stream from the data message.

In some implementations, generating the minutiae template can include identifying a location for each of the plurality of minutiae points by sequentially retrieving two-dimensional location coordinates from a grid. Additionally, the orientation may be identified for each location coordinate using a first subset of the plurality of blocks by comparing bit values included in each block of the first subset with a look up table associating bit values with orientations. Additionally and/or alternatively, a second subset of the plurality of blocks may be used to identify a minutia point type for each of the plurality of minutiae points by comparing bit values included in each block of the second subset with a look up table associating bit values with minutia types. The identified minutia point type may be associated with the corresponding minutia point in the minutiae template. The minutia point type may be, for example, a ridge ending, a ridge bifurcation, a short ridge or ridge dot, an island, a ridge enclosure, a spur, a crossover, a bridge, a delta, a core, and/or the like.

In certain implementations, generating the minutiae template can include identifying two-dimensional location coordinates of each of the plurality of minutiae points on a minutiae template using a first subset of the plurality of blocks, and identifying the orientation for each location coordinate using a second subset of the plurality of blocks by comparing bit values included in each block of the second subset with a look up table associating bit values with orientations.

Optionally, each of the plurality of blocks may include 3 bits.

In some example implementations, the methods may also include receiving an image comprising a first artificial fingerprint, identifying at least one artificial fingerprint of a plurality of artificial fingerprints stored in the data store as a match for the first artificial fingerprint, and outputting a first bit stream stored in association with the at least one artificial fingerprint in the data store as being encoded by the first artificial fingerprint.

In some other implementations, the methods may also include storing the minutiae template in association with the bit stream in the data store. In such example, the methods may include receiving an image comprising a first artificial fingerprint, generating a first minutiae template comprising a first plurality of minutiae points from the first artificial fingerprint, identifying at least one minutiae template, of a plurality of minutiae templates stored in the data store, as a match for the first minutiae template, and outputting a first bit stream stored in association with the at least one minutiae template in the data store as being encoded by the first artificial fingerprint.

In certain other aspects, systems and methods for encoding data in a machine-readable image (e.g., an artificial fingerprint) are disclosed. The systems may include a processor and a non-transitory computer readable medium including programming instructions that cause the processor to execute the methods. The methods may include segmenting, a plurality of bits included in a bit stream to be encoded, into a plurality of blocks such that each block includes 2 or more of the plurality of bits. The plurality of blocks may then be used to generate a minutiae template comprising a plurality of minutiae points, each being representative of a local ridge discontinuity in a human fingerprint and associated with a location and an orientation. A machine-readable image that encodes the bit stream may be generated from the minutiae template, and stored in a data store.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another and is not intended to require a sequential order unless specifically stated.

Additional terms that are relevant to this disclosure will be defined at the end of this Detailed Description section.

As discussed above existing two-dimensional barcodes (e.g., QR codes) are not robust and it is often difficult to extract information when the barcode is damaged or partial. Furthermore, they can be used for cyberattacks. While information may be encoded within captured biometric fingerprints that include more complex features to overcome the above deficiencies of two-dimensional barcodes, such biometric fingerprints cannot be freely used, stored, or reproduced because of the risk of disclosing personal information. Moreover, biometric fingerprints require special biometric scanning devices for extraction of encoded information. Finally, current approaches encoding data within captured biometric fingerprints require an existing cover fingerprint image within which data is encoded by altering the image, and they are not robust against fingerprint binarization and thinning. This disclosure overcomes these issues by describing systems and methods for encoding information by constructing artificial fingerprints (without the use of cover images) based on the original message to be encoded. Such artificially created fingerprints can be scanned using commonly available imaging devices (e.g., cameras) and do not have any constraints with respect to storage and/or reproduction for widespread usage. In other words, the artificial fingerprints are machine readable, and the original message can be extracted or decoded from the artificial fingerprint.

Figure 1:
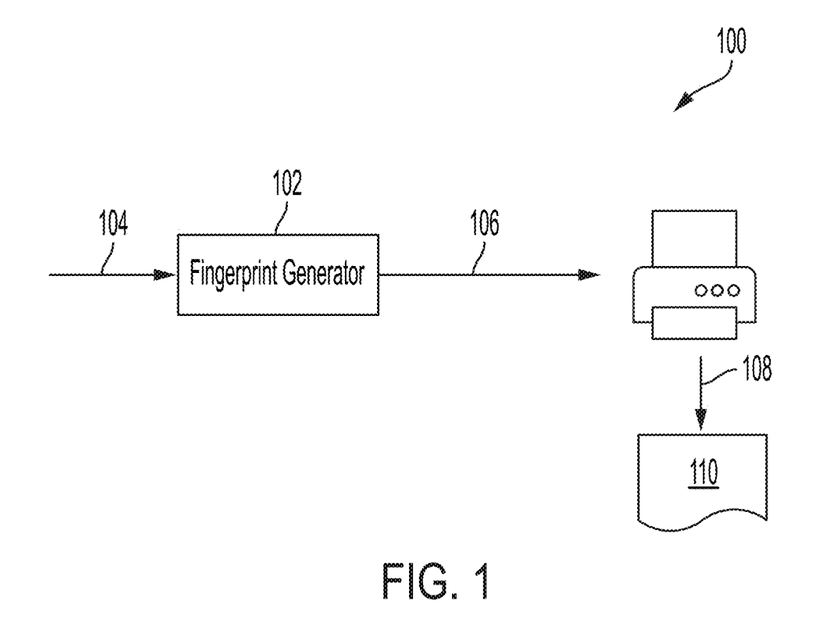
FIG. 1 illustrates an example artificial fingerprint generator system.
Figure 9:
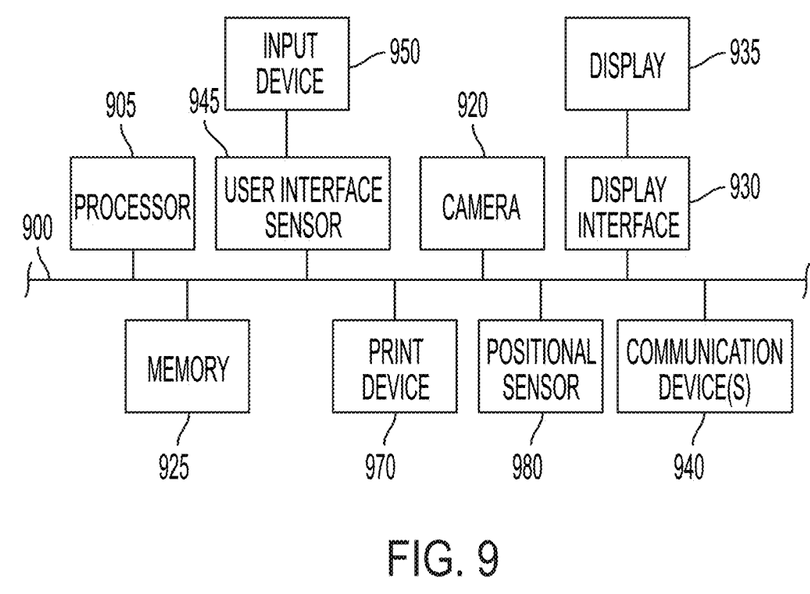
FIG. 9 illustrates example components of computing devices that may be used for by or as various entities of the system.

FIG. 1 illustrates an example artificial fingerprint generator system 100 suitable for encoding information in artificial fingerprints in accordance with this disclosure. The artificial fingerprint generator system 100 may include an artificial fingerprint generator 102 and a print device 108. The artificial fingerprint generator 102 may receive input data 104 that is to be encoded into the artificial fingerprint, such as an original message. A "data message" (or original message) refers to any information (text, numeric, symbolic, etc.), the data message convertible to a bit sequence (e.g., a binary representation including a stream of 1's and 0's) using any or hereafter known methods. The input data 104 may also include visual specifications for the artificial fingerprint such as a foreground color, background color, size requirements, resolution requirements, or the like. The artificial fingerprint generator 102 generates an artificial fingerprint 106 including encoded data. The artificial fingerprint 106 is supplied to a printer 108 (along with other graphics) to be printed on a substrate 110 (or an object). The artificial fingerprint 106 may be embedded within a graphics file along with the other graphics or provided as a separate graphics file. Accordingly, the printer 108 may print the artificial fingerprint on the substrate 110 at the same time as printing the other graphics or after/before printing the other graphics. The size of the artificial fingerprint 106 may, optionally, be scaled to a size appropriate for the substrate on which the artificial fingerprint will be printed. For example, the artificial fingerprint 106 may be scaled to a first size for use on a first substrate and scaled to a second size for a second substrate, where the first size is smaller than the second size. Optionally, the artificial fingerprint may be displayed on a display device.

It should be noted that the artificial fingerprint generator system 100 may include two or more computing devices (examples of which are described below with respect to FIG. 9) in communication with each other that collaborate to perform a task.

The machine-readable artificial fingerprint disclosed here can encode any type of data and be printed, embossed, etched, engraved, or otherwise visually marked on any substrate or object. The artificial fingerprint may be visually perceptible to people as well as machines or may only be perceptible by machines. For example, the artificial fingerprint may be printed on an object in UV or IR fluorescing ink or otherwise marked on an object in a manner that is not visually perceptible to a person.

Figure 2:
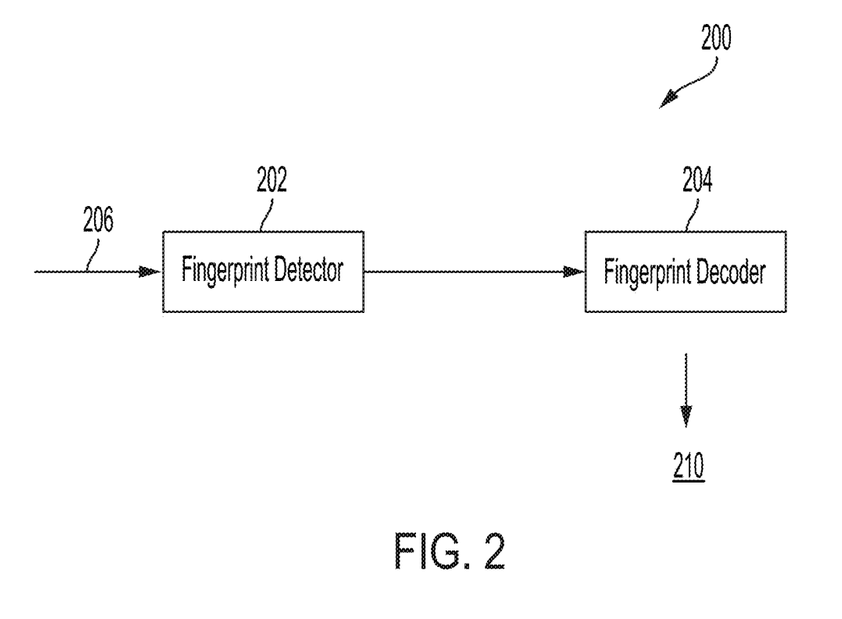
FIG. 2 illustrates an example artificial fingerprint reader system.

FIG. 2 illustrates an exemplary artificial fingerprint reader 200 suitable for decoding information from artificial fingerprints in accordance with this disclosure. The artificial fingerprint reader 200 includes an artificial fingerprint detector 202 and an artificial fingerprint decoder 204. The artificial fingerprint detector 202 is configured to receive an input image 206 and detect the artificial fingerprint 106 within the input image 206. Examples of the artificial fingerprint detection 202 can include, without limitation, an imaging device (e.g., a camera), a scanner, or the like. The artificial fingerprint detector 202 may optionally be configured to produce a processed image 208 using any now or hereafter known image processing techniques. Examples of the processed image can include, without limitation, a cropped image as a portion of the input image 206 that includes the artificial fingerprint 106, a higher resolution image, an image with enhanced contrast, an image including a portion of an artificial fingerprint that is missing from the input image 206, or the like. The artificial fingerprint decoder 204 is configured to receive the image 206 (and/or the processed image 208) with the detected artificial fingerprint 106 and decode the artificial fingerprint to extract information 210 (e.g., data message encoded within the fingerprint 106). %

It should be noted that the artificial fingerprint reader system 200 may include two or more computing devices (described below with respect to FIG. 9) in communication with each other that collaborate to perform a task.

Figure 3:
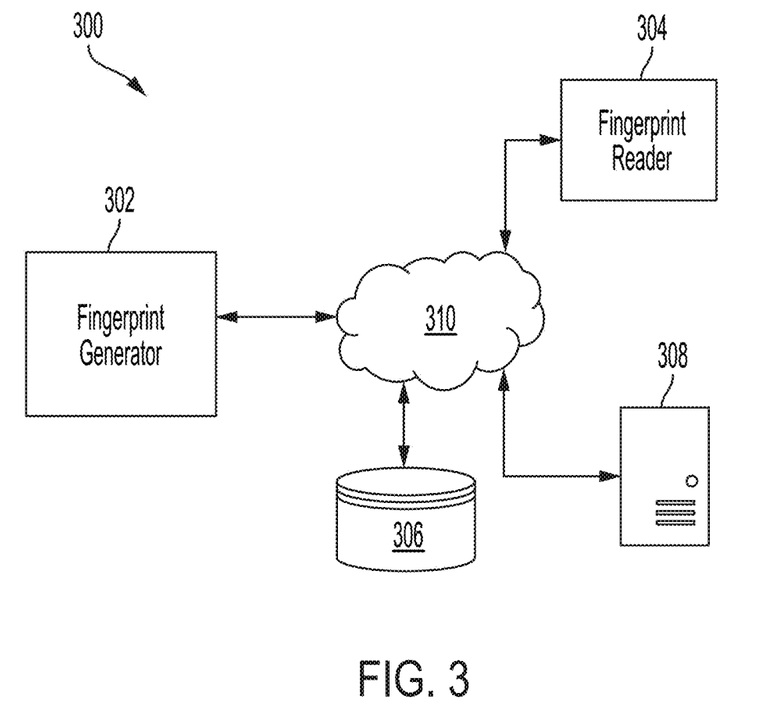
FIG. 3 illustrates an example system for generating artificial fingerprints for encoding information and extracting information.

FIG. 3 illustrates an example system for implementing various example embodiments of this disclosure. As shown in FIG. 3, the system 300 includes a fingerprint generator 302 (e.g., artificial fingerprint generator 100 of FIG. 1), a fingerprint reader 304 (e.g., artificial fingerprint reader 200 of FIG. 2), a data store 306, and a remote server 308, communicatively coupled with each other via a network 310. The network 310 may include a combination of one or more wired and/or wireless technologies for one or more local area network (LAN), wide area network (WAN), metro area network (MAN), cellular network(s), the internet, or any other such networking technology for communicating data between computing devices.

The fingerprint generator 302 may be configured to generate an artificial fingerprint from a data message and store it in the data store 306. Optionally, the data store 306 may also include information relating to various rules or look up tables (e.g., mapping(s) of bit blocks to types/orientations of minutiae points used for creating an artificial fingerprint, as discussed below). The fingerprint reader 304 may be configured to capture an image including an artificial fingerprint (e.g., when printed on a substrate, displayed on display device, etc.) and process the captured image to generate the original data message. The fingerprint reader 304 may output the original data message via, for example, a display device of a mobile device 314. Optionally, the fingerprint reader 304 may process the original data message and output the processed message. For example, if the original data message includes a uniform resource locator (URL) to a website, the output may be the website (e.g., via a browser of a mobile device 314). In another example, if the original data message is a link to a product specification, the output may be the product specification.

Optionally, the fingerprint reader 304 may communicate the original data message to a remote server 308, that may process the original data message and output the original data message and/or the processed message.

Figure 4:
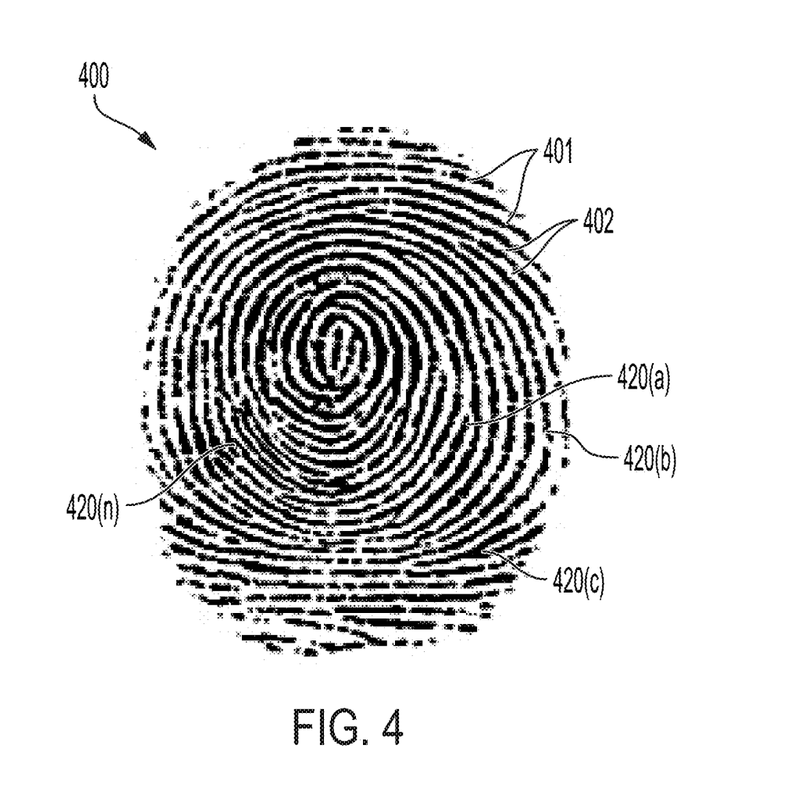
FIG. 4 illustrates an example artificial fingerprint.

FIG. 4 illustrates an example artificial fingerprint that can be used to encode information. As shown in FIG. 4, the artificial fingerprint 400 is a distinct pattern of ridges 401 and valleys 402, where a ridge is defined to be a single curved segment whereas a valley is the area between two adjacent ridges. On a two-dimensional substrate, each ridge may be formed by printing ink or toner on a substrate, and each valley may be a blank area adjacent to a ridge or between two ridges. Alternatively, a valley may be formed by printing an ink or toner that has a different color than the color of the ridges, so that ridges and valleys are visually discernible from each other. Fingerprints can be classified into different types or classes based on the general ridge formation within the fingerprint such as an arch, a loop, a whorl, a tented arch, and a composite; and the artificial fingerprint 400 may be any now or hereafter known type.

An "artificial fingerprint" refers to an image or pattern having markings, shapes, and contours (collectively, "patterns") that exhibit the visual appearance of a typical human fingerprint. It should be noted that while an artificial fingerprint that includes patterns that exhibit the visual appearance of a typical human fingerprint, such an artificial fingerprint can take any overall size and/or shape without being limited to the size and/or shape (e.g., oval) of a typical human fingerprint. In some embodiments, the patterns of a human fingerprint may be represented as a machine-readable image including a map of fingerprint features 420(a)-(n) called minutiae points. Minutiae points can be defined as the points where local ridge discontinuities exist (i.e., the ridge lines end or fork). Each minutia point 420 of the artificial fingerprint 400 can be associated with the following characteristics: a location (x,y coordinates on a grid corresponding to the fingerprint representing where each minutia point is located), an orientation (an angle that defines the direction of the underlying ridge at the minutia point location), and a type. Example types of minutiae points may include, without limitation, a ridge ending (point where the ridge ends suddenly), a ridge bifurcation (point where a single ridge branches out into two or more ridges), a short ridge or ridge dot (very small ridge), an island (slightly longer than dots and occupy a middle space between two diverging ridges), a ridge enclosure (a single ridge that bifurcates and reunites shortly afterward to continue as a single ridge), a spur (a notch protruding from a ridge), a crossover (formed when two ridges cross each other), a bridge (small ridges that join two longer adjacent ridges), a delta (point on a ridge at or in front of and nearest the center of the divergence of the type lines—i.e., a Y-shaped ridge meeting), or a core (a dead-end formed by a ridge that loops back on itself).

The artificial fingerprint 400 may be created by sequencing the location (x,y) of each minutia point on a grid having known coordinate locations (i.e., x, y coordinates) for each of the grid points (e.g., a pixel map), and assigning a unique state to the orientation and a unique state to the type of that minutia point. The size of the grid may be selected based on the size of the artificial fingerprint to be created.

A "unique state" refers to one state from a set of possible state values. For example, in a 2-state binary system (two orientation directions), the set of values is: {0, 1}. This set contains a total of $2^1=2$ possible unique states a single data value can take. In a 4-state binary system (4 orientation directions), the set of values is: {00, 01, 10, 11}. This set contains a total of $2^2=4$ possible unique states a single data value can take. Another 8-state binary system contains the values: {000, 001, 010, 011, 100, 101, 110, 111}. This set contains a total of $2^3=8$ unique states, and so on. An example data encoding scheme of the current disclosure utilizes the binary system such that the orientation can assume one of nine unique states (including when no data is recorded) using a 3-bit encoding scheme. For example, in addition to no data state, the remaining seven orientation states (e.g., seven equally distributed orientation states) can be selected from the following: no data, pointing up, upper-right (at any desired angle), right, lower-right (at any desired angle), down (at any desired angle), lower-left (at any desired angle), left, and upper-left (at any desired angle), or the like; and associated with the unique states of an encoding scheme being used. Similarly, the type may assume one of eight unique states using a 3-bit encoding scheme. For example, the type can be selected from any of now or hereafter known minutiae point types such as, without limitation, no feature, a ridge ending, a ridge bifurcation, a short ridge, a ridge dot, an island, a ridge enclosure, a spur, a crossover, a bridge, a delta, a core, or the like; and associated with the unique states of an encoding scheme being used. In the case of a 3-bit encoding scheme, eight unique orientations and eight unique types may embed a subset of all possible orientation/type values for a given minutia point, which may be selected manually and/or automatically. For example, the unique state of 000 might be associated with an orientation along the positive x-axis; the unique state of 001 might be associated with an orientation along the positive y-axis; the unique state 010 might be associated with the +45° diagonal direction between the positive x-axis and the positive y-axis, and so on. Optionally, the orientation and the type may have a different number of unique states (e.g., the orientation may assume eight unique non-zero states while the type may assume sixteen states represented as 0000, 0001, and so on using a 4-bit encoding scheme). It should be understood that, in the present method, each of the unique states from the set of possible unique state values is mapped, in a one-to-one correspondence, to a particular orientation direction that a minutia point of a particular type can take. A minutia point would thus only be printed having one of the possible orientation directions defined for that particular type. Note, while sets of binary values are shown for ease of illustration, the unique states can in general be derived from any arbitrary set whose cardinality does not necessarily have to be a power of 2.

A look up table, rule set, or the like, may be created for associating a state (type and orientation) with a value according to the selected encoding scheme, and stored in a data store.

For encoding a data message (including the bit stream of 0's and 1's), the corresponding bit stream may be segmented into blocks, each block including the number of bits corresponding to the encoding scheme representative of the unique minutia point orientation states and the unique minutia point type states. In various embodiments, additional bits (or blocks) may be added to known sections of the data message (e.g., at the front, at the end, periodically after a certain number of blocks, etc.) to store certain parameters related to the fingerprint format, data error correction codes, or the like.

Figure 5:
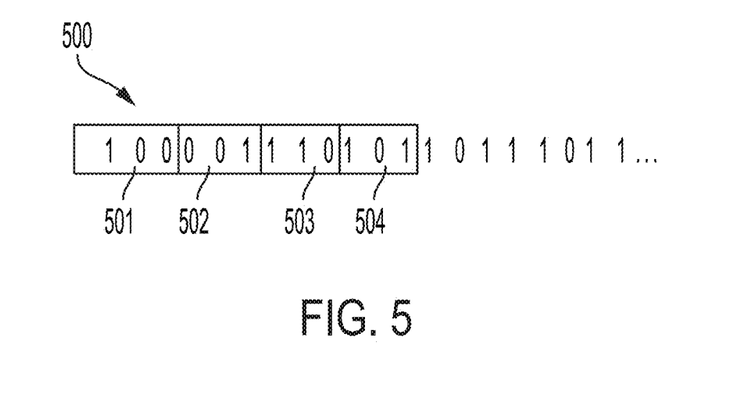
FIG. 5 illustrates an example bit stream including blocks associated with type and orientation of minutiae points.

FIG. 5 illustrates this segmentation and type/orientation assignment process for a bit stream 500. As shown in FIG. 5, type/orientation assignment process assigns a type and an orientation to a minutia point location sequentially based on the value of each segmented block (both type and orientation being encoded using a 3-bit encoding scheme). For example, the minutia point having a coordinate location (0,0) is assigned a type corresponding to the value 100 (retrieved from a data store or look up table) of block 501 and orientation corresponding to the value 001 (retrieved from a data store or look up table) of block 502. Similarly, the next minutia point having a coordinate location (0,1) is assigned a type corresponding to the value 110 (retrieved from a data store or look up table) of block 503 and orientation corresponding to the value 101 (retrieved from a data store or look up table) of block 504. While FIG. 2 illustrates the first blocks 501 and 503 being associated with the type followed by blocks 502 and 504 being associated with the orientation, the disclosure is not so limiting and blocks 501 and 503 may be associated with orientation while the blocks 502 and 504 may be associated with type.

Figure 6A:
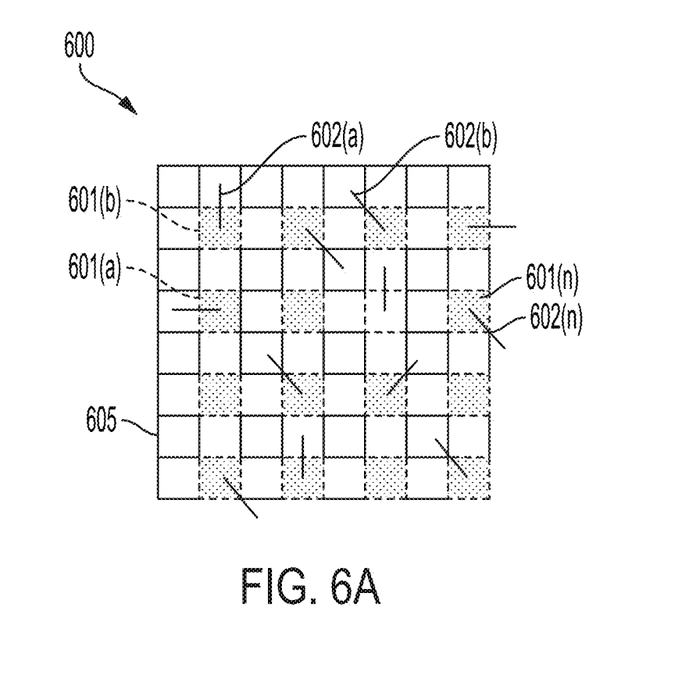
FIGS. 6A and 6B illustrate example minutiae templates.
Figure 6B:
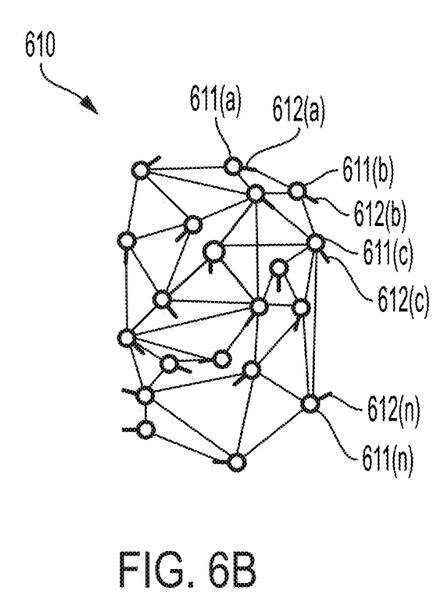

Such assignment may be performed sequentially for each of a plurality of (x,y) minutiae point locations on a grid 605 to generate a minutiae template 600 as shown in FIG. 6A. For example, for a 4-bit encoding scheme for minutiae point type and a 4-bit encoding scheme minutiae point orientation, each grid point location corresponds to 8 continuous bits of data in a data steam. As such for a 4-bit encoding scheme for type and orientation, an M×N grid will cover 8*M*N total bits of data. Optionally, zero padding may be performed for a data stream for the data stream fill the entire minutiae template or grid using any now or hereafter known techniques. The minutiae template 600 includes minutiae point locations 601(a), (b) . . . (n) and corresponding orientations 602(a), (b) . . . (n). Each location is also associated with a unique minutiae point type (not shown here). In this approach, each grid point may be filled with 8 (4-bit Type and 4-bit Orientation) bits from the data stream in a 4-bit encoding scheme Another example minutiae template 610 including minutiae point locations 611(a), (b) . . . (n) and corresponding orientations 612(a), (b) . . . (n) is shown in FIG. 6B. In the example of FIG. 6B, the minutiae points are not arranged in a regular grid formation, but as a $2^p \times 2^q$ minutiae template. Such a template is formed by encoding the (x,y) coordinate location of each minutia point using an encoding scheme. For example, coordinate location may be represented as unique states of a selected encoding scheme. For example, the first p bits in a data stream represent may represent an x-coordinate of a first minutia point, the next q bits in a data stream represent may represent a y-coordinate of the first minutia point, the next 4 bits may represent a type of the first minutia point (assuming a 4-bit encoding scheme for type), and the next 4 bits may represent an orientation of the first minutia point (assuming a 4-bit encoding scheme for orientation). As such, information relating to all of the minutia points may be sequentially encoded within a bit stream to generate a $2^p \times 2^q$ minutiae template. The information included in the minutiae template may be used to construct an artificial fingerprint (e.g., fingerprint 300 of FIG. 3) encoding the data message using any now or hereafter known methods for synthesizing fingerprints from minutiae. For example, (described in Feng et al., *Fingerprint Reconstruction: From Minutiae to Phase* (2011)) a phase image may be reconstructed from the minutiae grid template followed by conversion to a greyscale image. The phase image is composed of the continuous phase and the spiral phase. A reconstructed fingerprint is obtained by reconstructing the orientation field, reconstructing the continuous phase, and combining the continuous phase with the spiral phase.

Figure 7:
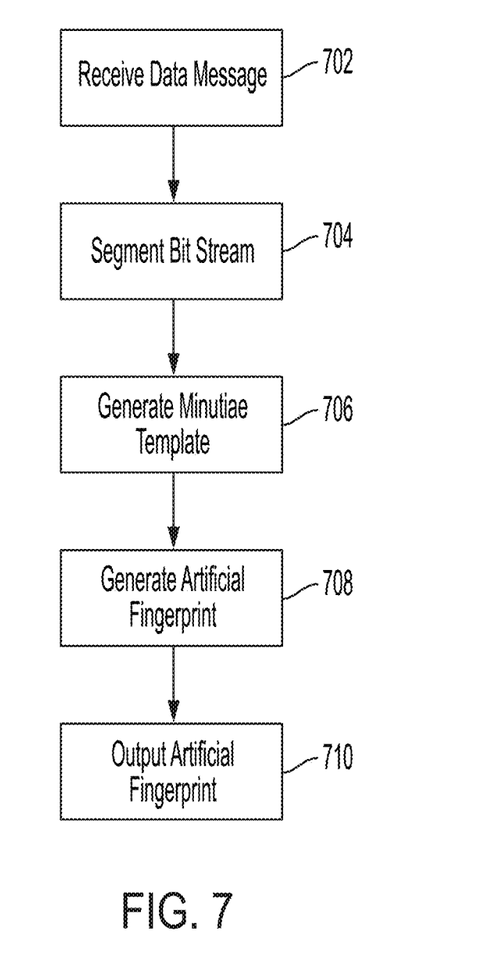
FIG. 7 is a flow diagram that illustrates a method of generating artificial fingerprints.

FIG. 7 illustrates an example process by which systems such as those of FIGS. 1 and 3 may generate an artificial fingerprint. The process may begin at 702, when the system may receive a data message to be encoded. Optionally, the data message may be converted to a bit stream if it is not in a bit format when received by the system.

At 704, the system may segment the bit stream to generate blocks of a size from which orientation and type (and/or location coordinates) of minutiae points can be determined (as shown in FIG. 5). For example, as discussed above, if the orientation and/or type can assume 8 different unique states, each block from which the orientation/type value will be derived includes 3 bits. Similarly, if the orientation and/or type can assume 16 different unique states, each block from which the orientation/type value will be derived includes 4 bits.

The system may then generate (706) a minutiae template from the segmented bit stream of the data message. As discussed above, for generating the minutiae template, the location coordinates are derived sequentially from a grid of minutiae points and/or from the bit stream when encoded within the bit stream. Furthermore, the orientation and type of a minutia point at each location are assigned by matching bit values previously associated with orientation and/or type states (e.g., in a look up table) with the bit values included in the corresponding segmented blocks.

The system may generate an artificial fingerprint from the minutiae template (708) as discussed above, and output the generated artificial fingerprint (710). The artificial fingerprint may be output by, for example, storing in a data store, printing on a substrate, displaying on a display device, and/or the like. Optionally, other information such as the look up table including the association between bit values and type/orientation, the minutiae templates, the bit streams, etc. may also be stored in the data store.

Figure 8:
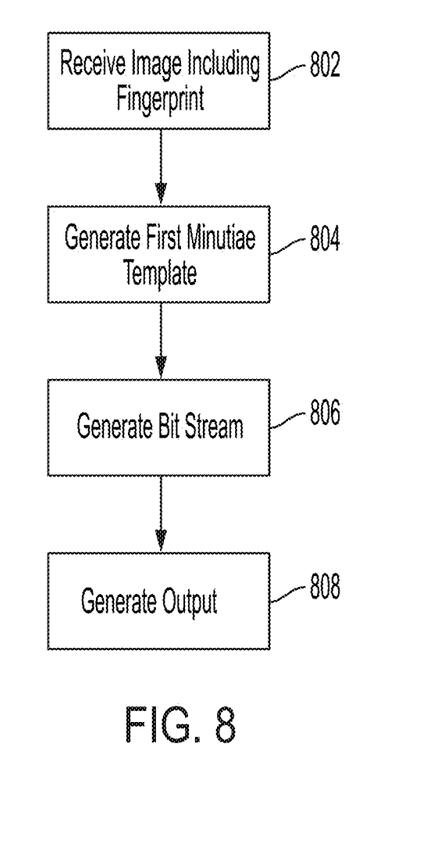
FIG. 8 is a flow diagram that illustrates a method of extracting information from an artificial fingerprint.

FIG. 8 illustrates an example process by which systems such as those of FIGS. 2 and 3 may extract information from an artificial fingerprint. The process may begin at 802, when the system may receive an image including an artificial fingerprint. For example, the system may receive the image from a scanner, an imaging device (e.g., a camera of a mobile device), or the like. Optionally, as discussed above, the system may process the received image to generate a processed image (e.g., a cropped image, a higher resolution image, etc.).

The artificial fingerprint (804) may be analyzed to generate a first minutiae template which is a template (e.g., a grid or other representation) that includes a plurality of minutiae points with their corresponding location coordinates, orientations, and types. Any now or hereafter known fingerprint analysis methods and systems may be used to generate the minutiae template.

At 806, the system may generate a bit stream by sequentially associating (sequence determined based on location coordinates of the minutiae points) the orientation and type of each minutia point in the minutiae template with corresponding bit values (e.g., using a look up table). Specifically, the system may first identify for each minutia point coordinate and type, corresponding bit values, and concatenate the bit values in accordance with the sequence of location coordinate with respect to a grid. Optionally, the coordinates may also be used to derive bit values.

A data message may be identified by processing the bit stream, and an output may be generated (808). The output may include the data message and/or the bit stream. Optionally, the data message may be processed as discussed above to generate the output (e.g., a web browser may be displayed as an output when the data message includes a URL). The output may, optionally, be displayed on a display device, transmitted to a user device, and/or stored in a data store.

Optionally, the system may identify a match for the received artificial fingerprint in a data store including previously created artificial fingerprints. The match may be identified using any now or hereafter known fingerprint matching techniques. In certain embodiments, the matching methods may take into account size of the fingerprints such that only fingerprints having sizes within a certain tolerance are considered a match. In certain other embodiments, the matching methods may not take into account size of the fingerprints. A person of ordinary skill in the art will understand that, only a certain number of minutiae points included in the artificial fingerprint (e.g., about 25-75%, about 30-70%, about 40-60%, about 50%, or the like may be required to uniquely identify the artificial fingerprint. The system may generate a second minutiae template associated with the identified matching fingerprint and compare it with the first minutiae template to identify and/or add any missing minutiae points in the first minutiae template, before generating the bit stream.

In certain embodiments, the matching may be performed at the minutiae template level by comparing the generated minutiae template with previously stored minutiae templates instead of identifying matching fingerprints in order to identify and/or add missing minutiae points in the first minutiae template, before generating the bit stream. Moreover, minutiae point matching also allows for robustness small changes in, for example, coordinates due to a resolution conversion. As such, encoding information within an artificial fingerprint is robust to partial image acquisition during information extraction and/or damage to the artificial fingerprint (unlike existing two-dimensional codes).

In certain embodiments, the matching may be performed at the data stream level by comparing the generated data stream with a previously stored data stream in association with the identified matching fingerprint (and/or minutiae template) in order to identify and/or add any missing bit values before generating the data message.

It should be noted that matching may be performed individually and/or jointly at one or more of the fingerprint level, the minutiae points level, and/or the data stream level.

FIG. 9 depicts an example of internal hardware that may be included in any of the electronic components of the system, such as the fingerprint generator, the fingerprint reader, or a local or remote computing device in the system. An electrical bus 900 serves as a communication path via which messages, instructions, data, or other information may be shared among the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored.

An optional display interface 930 may permit information to be displayed on a display device 935 in visual, graphic, or alphanumeric format. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication systems. The communication device 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 that can capture video and/or still images. The system also may include a positional sensor 980 to detect position and movement of the device. Examples of positional sensors 980 include a global positioning system (GPS) sensor device that receives positional data from an external GPS network.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, various embodiments can operate with software, hardware, and/or operating system implementations other than those described in this document.

Terminology that is relevant to this disclosure includes:

A "printer" or "print device" is an electronic device that is capable of receiving commands and printing text, other characters, and/or images on a substrate. Print devices may include, but are not limited to, network printers, production printers, copiers and other devices using ink or toner, and multifunction devices that perform a combination of functions such as printing and scanning.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 9.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 204 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for encoding data, the method comprising, by a processor:
   segmenting a plurality of bits included in a bit stream to be encoded into a plurality of blocks, each block comprising two or more of the plurality of bits;
   generating, using the plurality of blocks, a minutiae template comprising a plurality of minutiae points, each of the plurality of minutiae points being representative of a local ridge discontinuity in a fingerprint, wherein each of the plurality of minutiae points is associated with a location and an orientation, wherein generating the minutiae template comprises:
   identifying a location for each of the plurality of minutiae points by sequentially retrieving two-dimensional location coordinates from a grid;
   identifying, using a first subset of the plurality of blocks, for each location coordinate, the orientation by comparing bit values included in each block of the first subset with a look up table associating bit values with orientations;
   identifying, using a second subset of the plurality of blocks, for each of the plurality of minutiae points, a minutia point type by comparing bit values included in each block of the second subset with a look up table associating bit values with minutia types; and associating the minutia point type with that minutia point in the minutiae template;

generating, from the minutiae template, an artificial fingerprint that encodes the bit stream and comprises a plurality of ridges and a plurality of valleys; and storing, in a data store, the artificial fingerprint in association with the bit stream.

2. The method of claim 1, further comprising printing the artificial fingerprint on a substrate.

3. The method of claim 1 further comprising:
receiving a data message; and
generating the bit stream from the data message.

4. The method of claim 1, wherein the minutia point type comprises at least one of the following: a ridge ending, a ridge bifurcation, a short ridge or ridge dot, an island, a ridge enclosure, a spur, a crossover, a bridge, a delta, or a core.

5. The method of claim 1, wherein each of the plurality of blocks comprises 3 bits.

6. The method of claim 1, further comprising:
receiving an image comprising a first artificial fingerprint;
identifying, from the data store, at least one artificial fingerprint, of a plurality of artificial fingerprints stored in the data store, as a match for the first artificial fingerprint; and
outputting a first bit stream stored in association with the at least one artificial fingerprint in the data store as being encoded by the first artificial fingerprint.

7. The method of claim 1, further comprising:
storing, in the data store, the minutiae template in association with the bit stream;
receiving an image comprising a first artificial fingerprint;
generating, from the first artificial fingerprint, a first minutiae template comprising a first plurality of minutiae points;
identifying, from the data store, at least one minutiae template, of a plurality of minutiae templates stored in the data store, as a match for the first minutiae template; and
outputting a first bit stream stored in association with the at least one minutiae template in the data store as being encoded by the first artificial fingerprint.

8. A system for encoding data, the system comprising:
a processor; and
a non-transitory computer readable medium comprising programming instructions that when executed by the processor will cause the processor to:
segment a plurality of bits included in a bit stream to be encoded into a plurality of blocks, each block comprising two or more of the plurality of bits;
generate, using the plurality of blocks, a minutiae template comprising a plurality of minutiae points, each of the plurality of minutiae points being representative of a local ridge discontinuity in a fingerprint, wherein each of the plurality of minutiae points is associated with a location and an orientation, wherein the programming instructions that when executed by the processor will cause the processor to generate the minutiae template comprise programming instructions to cause the processor to:
identify, using a first subset of the plurality of blocks, two-dimensional location coordinates of each of the plurality of minutiae points, on a minutiae template;
identify, using a second subset of the plurality of blocks, for each location coordinate, the orientation by comparing bit values included in each block of the second subset with a look up table associating bit values with orientations;
identify, using a second subset of the plurality of blocks, for each of the plurality of minutiae points, a minutia point type by comparing bit values included in each block of the second subset with a look up table associating bit values with minutia types; and
associate the minutia point type with that minutia point in the minutiae template;
generate, from the minutiae template, an artificial fingerprint that encodes the bit stream and comprises a plurality of ridges and a plurality of valleys; and
store, in a data store, the artificial fingerprint.

9. The system of claim 8, further comprising programming instructions that when executed by the processor will cause the processor to print the artificial fingerprint on a substrate.

10. The system of claim 8, further comprising programming instructions that when executed by the processor will cause the processor to:
receive a data message; and
generate the bit stream from the data message.

11. The system of claim 8, wherein the minutia point type comprises at least one of the following: a ridge ending, a ridge bifurcation, a short ridge or ridge dot, an island, a ridge enclosure, a spur, a crossover, a bridge, a delta, or a core.

12. The system of claim 8, wherein each of the plurality of blocks comprises 3 bits.

13. The system of claim 8, further comprising programming instructions that when executed by the processor will cause the processor to:
receive an image comprising a first artificial fingerprint;
identify, from the data store, at least one artificial fingerprint, of a plurality of artificial fingerprints stored in the data store, as a match for the first artificial fingerprint; and
output a first bit stream stored in association with the at least one artificial fingerprint in the data store as being encoded by the first artificial fingerprint.

14. The system of claim 8, further comprising programming instructions that when executed by the processor will cause the processor to:
store, in the data store, the minutiae template in association with the bit stream;
receive an image comprising a first artificial fingerprint;
generate, from the first artificial fingerprint, a first minutiae template comprising a first plurality of minutiae points;
identify, from the data store, at least one minutiae template, of a plurality of minutiae templates stored in the data store, as a match for the first minutiae template; and
output a first bit stream stored in association with the at least one minutiae template in the data store as being encoded by the first artificial fingerprint.

15. A method for encoding data, the method comprising, by a processor:
segmenting, a plurality of bits included in a bit stream to be encoded, into a plurality of blocks, each block comprising 2 or more of the plurality of bits;
generating, using the plurality of blocks, a minutiae template comprising a plurality of minutiae points, each of the plurality of minutiae points being representative of a local ridge discontinuity in a human fingerprint, wherein each of the plurality of minutiae points is associated with a location and an orientation, wherein generating the minutiae template comprises:
   identifying, using a first subset of the plurality of blocks, two-dimensional location coordinates of each of the plurality of minutiae points on a minutiae template; and
   identifying, using a second subset of the plurality of blocks, for each location coordinate, the orientation by comparing bit values included in each block of the second subset with a look up table associating bit values with orientations;
generating, from the minutiae template, a machine-readable image that encodes the bit stream; and
storing, in a data store, the machine-readable image.

* * * * *